(12) United States Patent
Maekawa

(10) Patent No.: US 6,431,601 B2
(45) Date of Patent: Aug. 13, 2002

(54) ELECTRIC POWER STEERING APPARATUS

(75) Inventor: Tomohiro Maekawa, Habikino (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/742,087

(22) Filed: Dec. 22, 2000

(30) Foreign Application Priority Data

Dec. 24, 1999 (JP) .......................................... 11-368317

(51) Int. Cl.$^7$ ................................................. B62D 1/11
(52) U.S. Cl. ........................ 280/777; 180/443; 180/444
(58) Field of Search ........................... 280/777; 464/30, 464/32, 88; 403/11, 12; 411/2, 3, 4, 5; 180/443, 444

(56) References Cited

U.S. PATENT DOCUMENTS

| | | | | |
|---|---|---|---|---|
| 3,698,209 A | * | 10/1972 | Moro .............................. 64/12 |
| 3,753,625 A | * | 8/1973 | Fabrizio et al. .............. 408/239 |
| 4,633,732 A | * | 1/1987 | Nishikawa et al. ........... 74/493 |
| 4,679,457 A | * | 7/1987 | Nishikawa et al. ........... 74/441 |
| 4,750,878 A | * | 6/1988 | Nix et al. ..................... 384/296 |
| 4,884,778 A | * | 12/1989 | Yamamoto .................. 248/548 |
| 5,482,128 A | * | 1/1996 | Takaoka et al. ........... 180/79.1 |
| 5,511,823 A | * | 4/1996 | Yamaguchi et al. ........ 280/777 |
| 5,931,620 A | * | 8/1999 | Sugai et al. ................... 411/82 |
| 5,953,961 A | * | 9/1999 | Stuedemann et al. ......... 74/492 |
| 6,006,854 A | * | 12/1999 | Nakajima .................... 180/446 |
| 6,044,723 A | * | 4/2000 | Eda et al. ................ 74/388 PS |
| 6,134,982 A | * | 10/2000 | Takabatake .................. 74/493 |

FOREIGN PATENT DOCUMENTS

| | | | |
|---|---|---|---|
| EP | 0581432 A1 | 2/1993 | |
| EP | 0970873 A2 | 1/2000 | |
| GB | 2258712 | * 8/1991 | ............ B62D/1/19 |

* cited by examiner

Primary Examiner—Lanna Mai
Assistant Examiner—Paul Royal, Jr.
(74) Attorney, Agent, or Firm—Birch, Stewart, Kolasch & Birch, LLP

(57) ABSTRACT

An electric power steering apparatus comprises a housing (22b) for housing rotatably a steering shaft (18) interlocked with a steering wheel (not shown), an electric motor (8a) which has a through hole (50) through which a screw member (53) is to be inserted and is attached to the housing (22b) the screw member (53) through the through hole (50) and a gear mechanism (57), (56), connected to the electric motor (8a) through a joint (55), for transmitting a torque of the electric motor (8a) to the steering shaft (18). The joint (55) is formed by a synthetic resin so as to detach the electric motor (8a) from the housing (22b) an impact force in an axial direction of the steering shaft (18). Even when a portion of a vehicle body and a mounting bracket, etc. belonging to the vehicle body are caught on the electric motor during the primary collision or secondary collision, it is possible to sufficiently absorb the impact force of the secondary collision.

16 Claims, 12 Drawing Sheets

A-A

A—A

ELECTRIC POWER STEERING APPARATUS

BACKGROUND OF THE INVENTION

The present invention relates to an electric power steering apparatus which is disposed in a housing rotatably a steering shaft interlocked with a steering wheel and comprises an electric motor for supplying a torque to the steering shaft.

As a power steering apparatus for a vehicle, there has been known, for example, an electric power steering apparatus including in a housing, which houses rotatably a steering shaft interlocked with a steering wheel, an electric motor for supplying a torque to the steering shaft.

In the case where the electric power steering apparatus is of a so-called column assist type, as shown in a depiction of FIG. 1 illustrating a state in which the electric power steering apparatus is mounted on a vehicle body, the electric power steering apparatus comprises a steering shaft 1 connected to a steering wheel 100; a housing 2 for housing the steering shaft 1 rotatably; and a mounting member 3 for mounting the lower side of the housing 2 to a vehicle body 104, and is disposed inside the compartment of the vehicle so that the mounting member 3 is attached to the vehicle body 104 and the center portion of the housing 2 is attached to the vehicle body 104 by a mounting member 4 having an impact force absorber for absorbing an impact force of the secondary collision during a collision.

In this electric power steering apparatus, on the lower side of the housing 2, an electric motor 8 is disposed in the vicinity of the mounting member 3, and a joint 106 for connecting the steering shaft 1 and a steering mechanism to each other is provided to pass through a dash panel 107.

In such an electric power steering apparatus, the steering shaft 1 and housing 2 are respectively divided into a plurality of parts in the axial direction, the divided parts have a structure fitting to each other, and their positional relationship is kept by calking, etc. When an impact force of not less than a predetermined value is applied in an axial direction, the steering shaft 1 and housing 2 shrink as their fitting structures overlap more deeply, and absorb the impact force.

Therefore, in the event of a head-on collision of a vehicle, after the primary collision, when the driver collides with the steering wheel 100 (secondary collision) due to a shock of the primary collision and then the impact force is applied to the steering shaft 1 and housing 2, the steering shaft 1 and housing 2 are pushed in an axial direction and shrink, while the impact force absorber of the mounting member 4 is broken, thereby absorbing the impact force of the secondary collision.

In a conventional electric power steering apparatus as described above, when a head-on collision of a vehicle occurs, if the vehicle body 104 including the dash panel 107 rises due to the impact force of the primary collision, as shown in FIG. 2, a portion of the vehicle body 104 and the mounting member 3, etc. belonging to the vehicle body 104 may be caught on the electric motor 8.

In this case, since the electric motor 8 is fixedly attached to the housing 2, as shown in FIG. 3, the housing 2 and steering shaft 1 can not shrink to an expected degree during the secondary collision, and thus there is a possibility that the impact force of the secondary collision is not sufficiently absorbed.

Moreover, even in the case of an electric power steering apparatus of a so-called pinion assist type, when parts (not shown) such as a transmission (not shown) attached to a vehicle body 104 go down due to the impact force of the primary collision, they may be caught on an electric motor 8. Thus, there is a possibility that the vehicle body 104 can not deform sufficiently and the impact force is not absorbed sufficiently.

For these reasons, positioning of the electric motor 8 poses a problem in installing the electric power steering apparatus on the vehicle body.

BRIEF SUMMARY OF THE INVENTION

An object of the present invention is to provide an electric power steering apparatus capable of solving the above problem.

An electric power steering apparatus according to the first invention, comprising: a housing for housing rotatably a steering shaft interlocked with a steering wheel; an electric motor which has a through hole through which a screw member is to be inserted and is attached to the housing by the screw member through the through hole; and a gear mechanism, connected to the electric motor through a joint, for transmitting a torque of the electric motor to the steering shaft, wherein in order to detach the electric motor from the housing by an impact force in an axial direction of the steering shaft, the through hole has a notch, and the joint is formed by a synthetic resin.

In this electric power steering apparatus according to the first invention, the housing houses rotatably the steering shaft interlocked with the steering wheel; the electric motor has the through hole through which the screw member is to be inserted and is attached to the housing by the screw member through the through hole; and the gear mechanism is connected to the electric motor through the joint and transmits the torque of the electric motor to the steering shaft. The electric motor has the notch in the through hole though which the screw member is to be inserted, and the joint is formed by a synthetic resin. Therefore, when an impact force in an axial direction of the steering shaft is applied, the screw member passes through the notch and comes out of the through hole, while the joint to be an obstacle to the screw member coming out of the through hole is broken, so that the electric motor is detached from the housing.

With this structure, even when a portion of a vehicle body and a mounting bracket, etc. belonging to the vehicle body are caught on the electric motor during the primary collision or secondary collision, since the electric motor is detached from the housing by the impact force of the primary collision or secondary collision, the housing and steering shaft can sufficiently absorb the impact force of the secondary collision, and the position of the electric motor can be easily determined in incorporating it into the vehicle body.

An electric power steering apparatus according to the third invention, comprising: a housing for housing rotatably a steering shaft interlocked with a steering wheel; an electric motor which has a through hole through which a screw member is to be inserted, is positioned by a positioning member and attached to the housing by the screw member through the through hole; and a gear mechanism, connected to the electric motor through a joint, for transmitting a torque of the electric motor to the steering shaft, wherein in order to detach the electric motor from the housing by an impact force in an axial direction of the steering shaft, the through hole has a notch, and the positioning member and joint are formed by a synthetic resin.

In this electric power steering apparatus according to the third invention, the housing houses rotatably the steering shaft interlocked with the steering wheel; the electric motor has the through hole through which the screw member is to be inserted, is positioned by the positioning member and attached to the housing by the screw member through the through hole; and the gear mechanism is connected to the electric motor through the joint and transmits the torque of the electric motor to the steering shaft. The electric motor has the notch in the through hole though which the screw member is to be inserted, and the positioning member and joint are formed by a synthetic resin that is broken more easily than a metal. Therefore, when an impact force in an axial direction of the steering shaft is applied, the screw member passes through the notch and comes out of the through hole, while the positioning member and joint to be obstacles to the screw member coming out of the through hole are broken, so that the electric motor is detached from the housing.

With this structure, even when a portion of a vehicle body and a mounting bracket, etc. belonging to the vehicle body are caught on the electric motor during the primary collision or secondary collision, since the electric motor is detached from the housing by the impact force of the primary collision or secondary collision, the housing and steering shaft can sufficiently absorb the impact force of the secondary collision, and the position of the electric motor can be easily determined in incorporating it into the vehicle body.

The electric power steering apparatus according to the second and fourth inventions, in the first and third inventions, in order to detach the electric motor from the housing by an impact force in an axial direction of the steering shaft, the notch is open from the through hole in an opposite direction to the steering wheel.

The electric power steering apparatus according to the second and fourth inventions, in the first and third inventions, since the notch is open from the through hole in the opposite direction to the steering wheel, even when a portion of a vehicle body and a mounting bracket, etc. belonging to the vehicle body are caught on the electric motor during the primary collision or secondary collision, the electric motor is detached relatively from the housing in the direction of the steering wheel by the impact force of the primary collision or secondary collision. Therefore, the housing and steering shaft can sufficiently absorb the impact force of the secondary collision, and the position of the electric motor can be easily determined in incorporating it into the vehicle body.

An electric power steering apparatus according to the fifth invention, comprising: a housing having at least with two engaging grooves, for housing rotatably a steering shaft interlocked with a steering wheel; an electric motor which has at least two engaging grooves provided at positions corresponding to the at least two grooves of the housing, is positioned by a positioning member and attached to the housing by engaging tightly respective end portions of at least two curved elastic members with the respective at least two engaging grooves of the housing and thereof, and a gear mechanism, connected to the electric motor through a joint, for transmitting a torque of the electric motor to the steering shaft, wherein in order to detach the electric motor from the housing by an impact force in an axial direction of the steering shaft, a part or all of the engaging grooves of the electric motor are open in a predetermined direction, and the positioning member and joint are formed by a synthetic resin.

In this electric power steering apparatus according to the fifth invention, the housing houses rotatably the steering shaft interlocked with the steering wheel and has at least two engaging grooves; and the electric motor has at least two engaging grooves provided at positions corresponding to the at least two grooves of the housing, is positioned by the positioning member and attached to the housing by engaging tightly respective end portions of at least two curved elastic members with the respective two grooves of the housing and thereof. The gear mechanism is connected to the electric motor through the joint and transmits the torque of the electric motor to the steering shaft. A part or all of the engaging grooves of the electric motor are open in a predetermined direction, and the positioning member and joint are formed by a synthetic resin that is more easily broken than a metal. Therefore, when an impact force in an axial direction of the steering shaft is applied, a part or all of the end portions of the elastic members are disengaged in the open direction of the engaging grooves, while the positioning member and joint to be obstacles to the disengagement of the end portions are broken, so that the electric motor is detached from the housing.

With this structure, even when parts such as a transmission attached to a vehicle body go down and are caught on the electric motor during the primary collision, the electric motor is detached from the housing in the opposite direction to the steering wheel by the impact force of the primary collision. Consequently, the vehicle body can deform sufficiently and absorb the impact force of the primary collision sufficiently, and the position of the electric motor can be easily determined in incorporating it into the vehicle body.

An electric power steering apparatus according to the sixth invention, comprising an electric motor attached to a housing for housing rotatably a steering shaft interlocked with a steering wheel, by a screw member through a through hole; and a gear mechanism, connected to the electric motor through a joint, for transmitting a torque of the electric motor to the steering shaft, wherein in order to detach the electric motor from the housing by an impact force in an axial direction of the steering shaft, the screw member and joint are formed by a synthetic resin.

In this electric power steering apparatus according to the sixth invention, the electric motor is attached to the housing for housing rotatably the steering shaft interlocked with the steering wheel, by a screw member through a through hole; and the gear mechanism is connected to the electric motor through the joint and transmits the torque of the electric motor to the steering shaft. Since the screw member and joint are formed by a synthetic resin, when an impact force in an axial direction of the steering shaft is applied, the screw member and joint are broken; and then the electric motor is detached from the housing.

With this structure, even when a portion of a vehicle body and a mounting bracket, etc. belonging to the vehicle body are caught on the electric motor during the primary collision or secondary collision, since the housing and steering shaft can sufficiently absorb the impact force of the primary collision or secondary collision, the position of the electric motor can be easily determined in incorporating it into the vehicle body.

The above and further objects and features of the invention will more fully be apparent from the following detailed description with accompanying drawings.

DETAILED DESCRIPTION OF THE INVENTION

The following description will explain the present invention with reference to the drawings illustrating the embodiments thereof.

Embodiment 1

Figure 4:
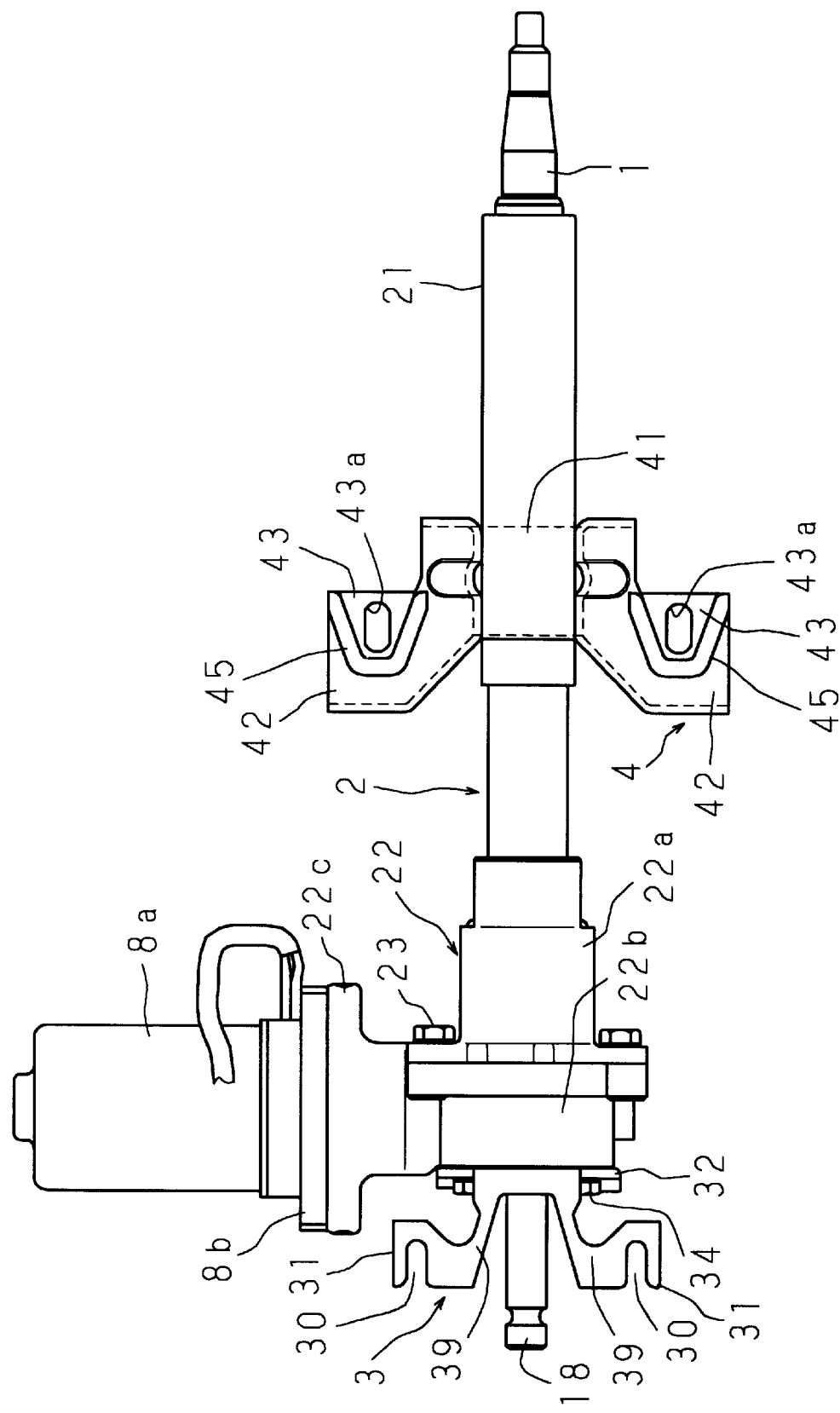
FIG. 4 is a front view showing the structure of an electric power steering apparatus according to the present invention.

FIG. 4 is a front view showing the structure of an electric power steering apparatus according to the present invention. This electric power steering apparatus is of a so-called column assist type, and comprises a steering shaft 1 whose one end portion is interlocked with a steering wheel 100 for steering; a housing 2 for housing and supporting the steering shaft 1 rotatably; a lower-side mounting member 3 for mounting a lower-side end portion of the housing 2 on a vehicle body; an upper-side mounting member 4 for mounting a center portion of the housing 2 in a longitudinal direction on the vehicle body; and a steering assisting electric motor 8a which is driven and controlled based on a steering torque applied to the steering shaft 1.

The housing 2 includes a cylindrical pipe portion 21 and a formed cylindrical portion 22 connected to the pipe portion 21 by press-fitting an end portion of the pipe portion 21 into the formed cylindrical portion 22, and the upper-side mounting member 4 is attached to a center portion of the pipe portion 21 in an axial direction. The formed cylindrical portion 22 includes a sensor-side cylindrical portion 22a housing a torque sensor (not shown) for detecting a steering torque applied to the steering shaft 1 and a motor-side cylindrical portion 22b connected to the electric motor 8a. These sensor-side cylindrical portion 22a and motor-side cylindrical portion 22b are coupled together by a plurality of fastening screws 23.

The motor-side cylindrical portion 22b has a plurality of mounting holes formed at equal intervals in a circumferential direction in the surface of its one end portion on the opposite side to the sensor-side cylindrical portion 22a. Moreover, one side of the motor-side cylindrical portion 22b to be connected to the electric motor 8a is made a flange portion 22c to be joined to a flange portion 8b of the electric motor 8a.

In the lower-side mounting member 3, one side plate portion of a metallic plate bent in an L-shape is formed as mounting pieces 31 having mounting holes 30, 30 for mounting on the vehicle body 104, and the other side plate portion is made a ring-shaped fixed portion 32 to be fixed to an end portion of the motor-side cylindrical portion 22b of the housing 2. The fixed portion 32 has a plurality of through holes corresponding to the above-mentioned mounting holes 30, 30 of the motor-side cylindrical portion 22b, which are formed at equal intervals in a circumferential direction, and is attached to the formed cylindrical portion 22 by tightly screwing mounting screws 34 inserted through these through holes into the mounting holes 30, 30.

The formed cylindrical portion 22 houses therein an input shaft (second steering shaft: not shown) coupled to the other end portion of the steering shaft (first steering shaft) 1, a torsion bar (not shown) whose one end portion is coupled to the input shaft, and an output shaft (third steering shaft) 18 (see FIG. 5B) coupled to the other end portion of the torsion bar.

The steering shaft 1 and housing 2 are respectively divided into a plurality of parts in the axial direction, and the divided parts have a structure fitting to each other to keep the positional relationship by calking, etc. When an impact force of not less than a predetermined value is applied in an axial direction, the steering shaft 1 and housing 2 shrink as the above-mentioned fitting structures overlap each other more deeply, and absorb the impact force.

Regarding the mounting piece 31 of the lower-side mounting member 3, a pair of the mounting pieces 31 are positioned separately, and the above-mentioned mounting holes 30, 30, each having a notch on its one side, are formed in these mounting pieces 31. Impact force absorbing portions 39, 39 having a notched groove portion are formed between the base portion and the mounting holes 30, 30 of the respective mounting pieces 31, 31, so that, when an impact force is applied from the driver to the steering wheel 100 due to a head-on collision of a vehicle, etc., the impact force absorbing portions 39, 39 are deformed to absorb the impact force.

The upper-side mounting member 4 is formed by a metallic plate in a grooved shape, and includes a U-shaped fixed piece 41 to be attached to the housing 2 and a pair of mounting pieces 42 which are bent at right angles from one end portion and the other end portion of the fixed piece 41, respectively, and are to be attached to the vehicle body 104. The mounting pieces 42 have notched groove portions extending in the axial direction of the housing 2, respectively, and hold in the notched groove portions first spacers 43, 43 which are made of a metal such as aluminum and have bolt holes 43a and second spacers 45, 45 which are made of a synthetic resin and have impact force absorbers, respectively, so as to fix the mounting member 4 to the vehicle body 104 by bolts inserted through the bolt holes 43a, 43a of the first spacers 43, 43.

In this fixed state, when the housing 2 is pushed in an axial direction via the steering shaft 1 and its bearing by an impact force applied from the driver to the steering wheel 100 due to a head-on collision of the vehicle, etc., the impact force absorbers of the second spacers 45 are broken and the upper-side mounting member 4 slides with respect to the first spacers 43, 43, thereby absorbing the impact force.

Figure 5A:
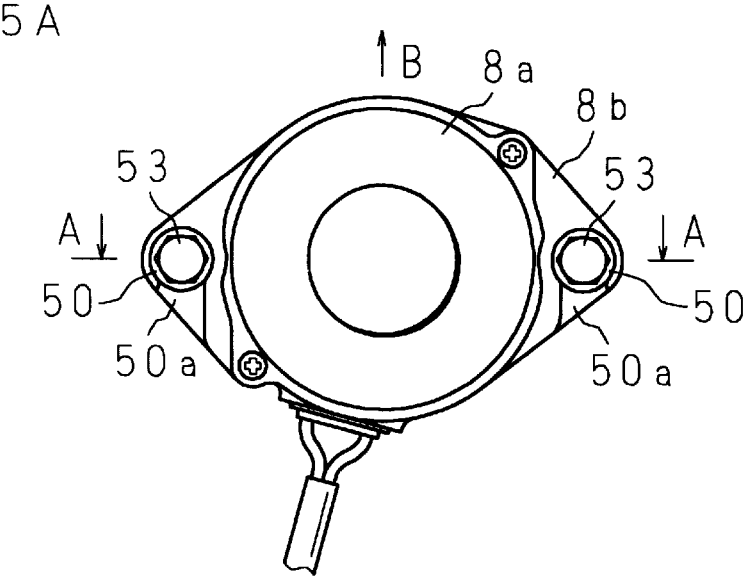
FIG. 5A is a plan view of an electric motor.
Figure 5B:
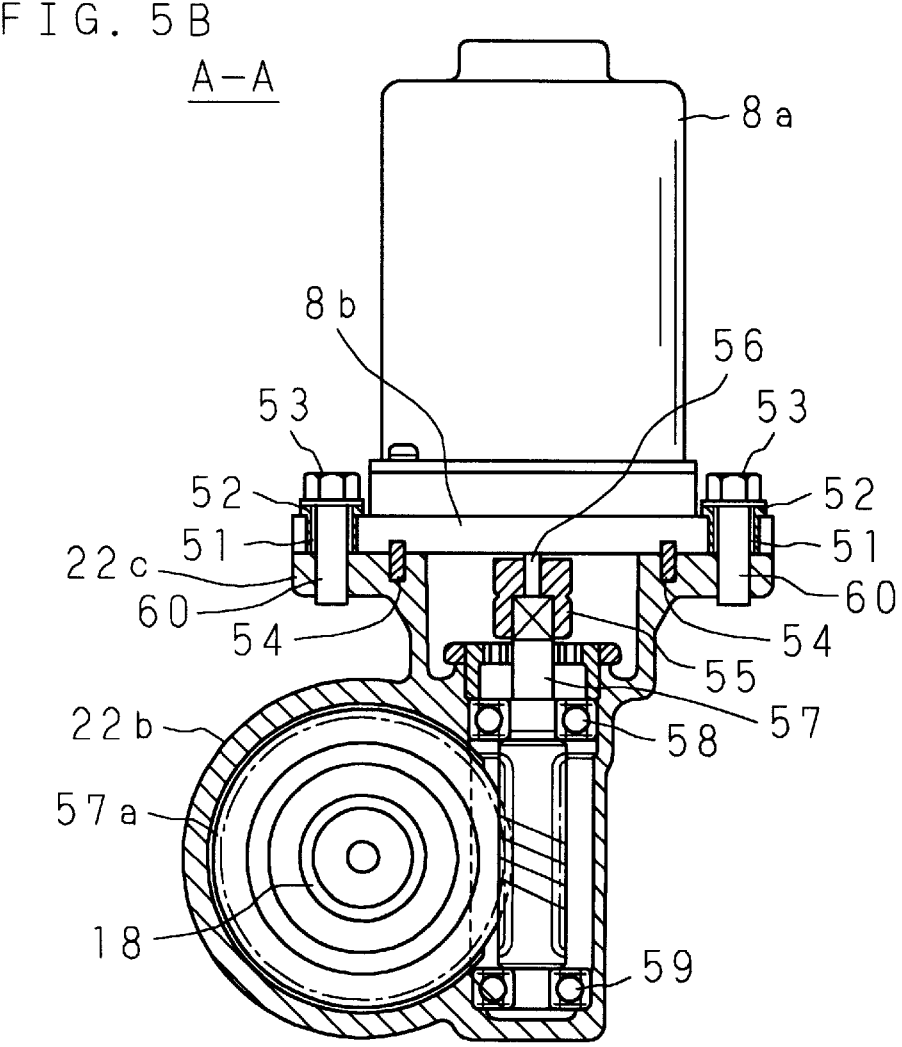
FIG. 5B is a partial transverse cross-sectional view of the electric motor and a motor-side cylindrical portion.

FIG. 5A is a plan view of the electric motor 8a, and FIG. 5B is a partial transverse cross-sectional view of the electric motor 8a and the motor-side cylindrical portion 22b.

The motor-side cylindrical portion 22b houses therein a worm wheel 57a fixed to the outer circumference of the output shaft 18 by fitting, a worm 57 meshing with the worm wheel 57a, and ball bearings 58, 59 engaged in one side and the other side of the worm 57 in the axial direction, respectively.

In the flange portion 8b of the electric motor 8a, notches 50a are formed in the through holes 50, 50 for screwing bolts (screw members) 53, 53 into screw holes 60, 60 formed in the flange portion 22c of the motor-side cylindrical portion 22b, respectively, so that, when an impact force is applied from the driver to the steering wheel 100 due to a head-on collision of a vehicle, etc, the electric motor 8a is detached from the flange portion 22c of the motor-side cylindrical portion 22b in the direction of arrow B (the upper side direction of the housing 2).

In the through holes 50, 50, the bolts 53, 53 are wound by metallic pipes 51, 51 made of aluminum, etc., and are held and fixed in the spacers 52, 52 formed by a synthetic resin or rubber in the state in which the bolts 53, 53 are wound by the metallic pipes 51, 51.

Figure 6:
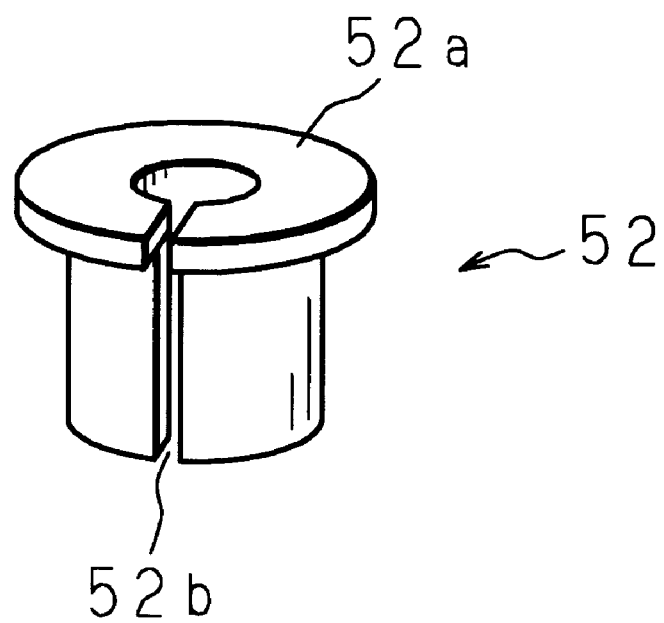
FIG. 6 is a perspective view showing the appearance of a spacer.

As shown in FIG. 6, the spacer 52 is formed in a cylindrical shape having a flange portion 52a in one end portion of the cylinder, and provided with a slit 52b cut across both end portions thereof so as to ease the detachment of the bolt 53.

An end potion 56 of the rotating shaft of the electric motor 8a is formed in a square plate shape, and an end portion on one side of the worm 57 in the axial direction is formed in a square column shape. These end portions are connected to each other by fitting them into holes formed in both bottom surfaces of a joint 55 formed by a synthetic resin, respectively.

Figure 7:
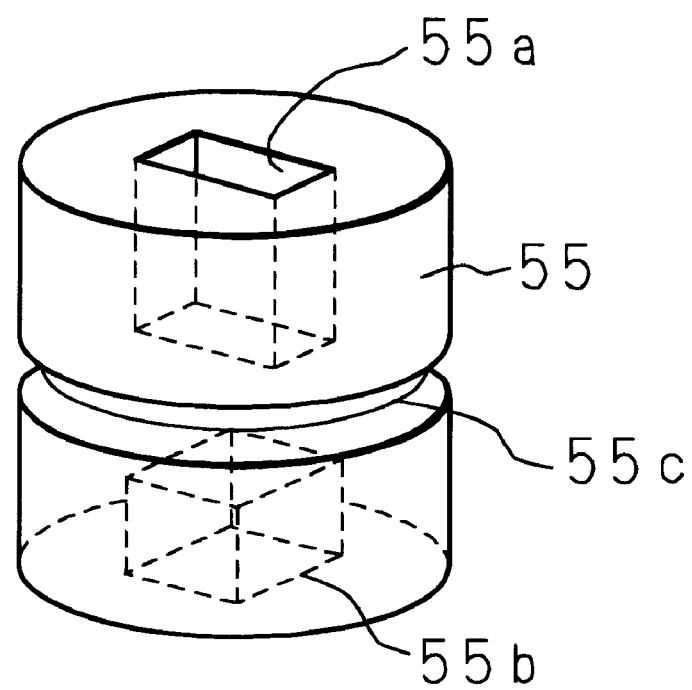
FIG. 7 is a perspective view showing the appearance of a joint.

As shown in FIG. 7, the joint 55 is formed in a cylindrical shape with a hole 55a into which the end portion 56 of the rotating shaft of the electric motor 8a is to be fitted, at the center of one of the bottom surfaces; a hole 55b into which the end portion on one side of the worm 57 in the axial direction is to be fitted, at the center of the other bottom surface; and a notching portion 55c formed along a circumferential surface in the vicinity of the center of a side surface. The joint 55 can adjust its strength by adjustment of the depth of the notching portion 55c and the material.

The flange portion 8b of the electric motor 8a and the flange portion 22c of the motor-side cylindrical portion 22b respectively have holes formed at two opposite positions in their mutually facing surface, and mutual positioning is carried out by fitting pins 54, 54 (positioning members) formed by a synthetic resin into the respective holes.

Figure 1:
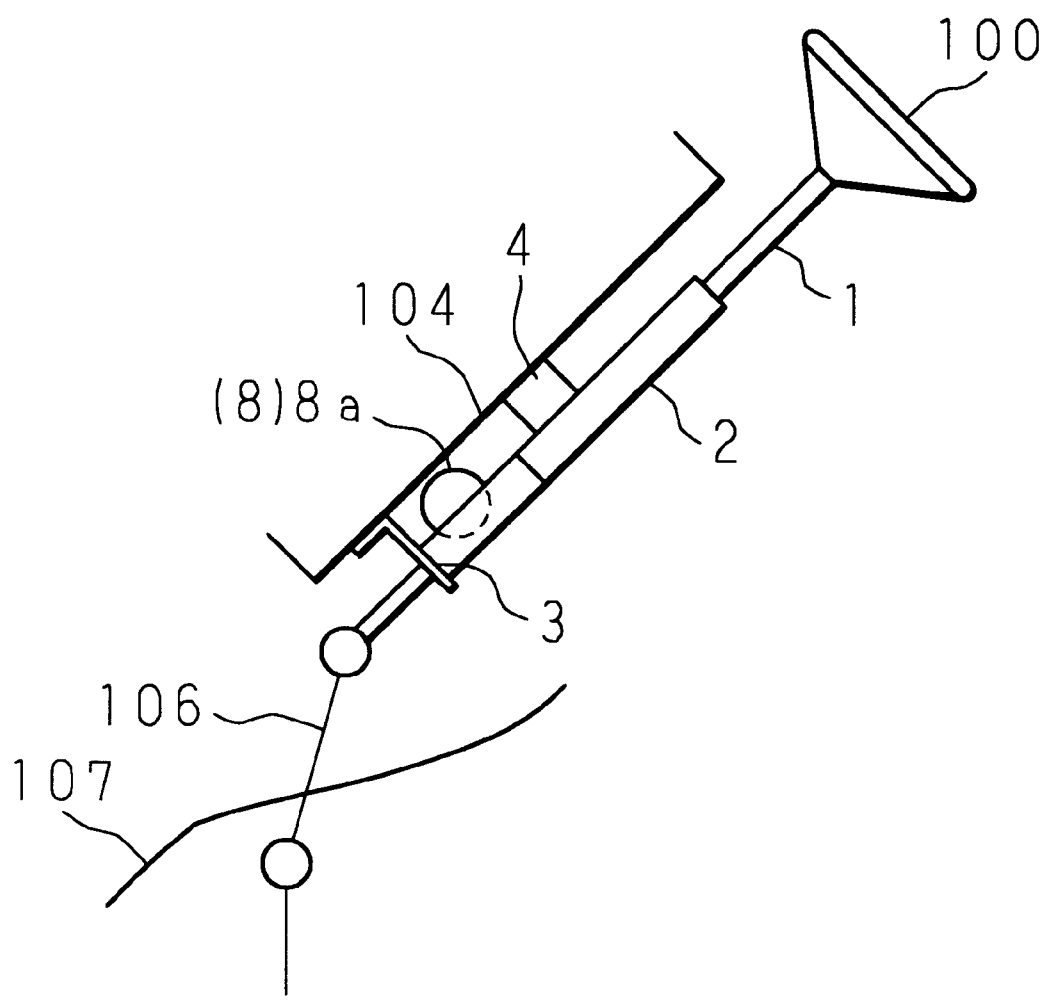
FIG. 1 is a depiction showing a state in which an electric power steering apparatus according to the present invention is mounted on a vehicle body.

FIG. 1 is a depiction showing a state in which an electric power steering apparatus having such a structure is mounted on a vehicle body 104. This electric power steering apparatus comprises a steering shaft 1 connected to a steering wheel 100; a housing 2 for housing the steering shaft 1 rotatably; and a mounting member 3 for mounting the lower side of the housing 2 on a vehicle body 104, and is disposed inside the compartment so that the mounting member 3 is attached to the vehicle body 104 and the center portion of the housing 2 is attached to the vehicle body 104 by a mounting member 4 having an impact force absorber for absorbing an impact force of the secondary collision during a collision.

In this electric power steering apparatus, on the lower side of the housing 2, an electric motor 8a is disposed in the vicinity of the mounting member 3 and a joint 106 for connecting the steering shaft 1 and a steering mechanism is positioned to pass through a dash panel 107 of the vehicle body 104.

In such an electric power steering apparatus, in the event of occurrence of a head-on collision of a vehicle, after the primary collision, when the driver collides with the steering wheel 100 (secondary collision) due to a shock of the primary collision and then the impact force is applied to the steering wheel 1 and housing 2, the steering shaft 1 and housing 2 are pushed in an axial direction and shrink, while the impact force absorber of the mounting member 4 is broken, thereby absorbing the impact force of the secondary collision.

Figure 2:
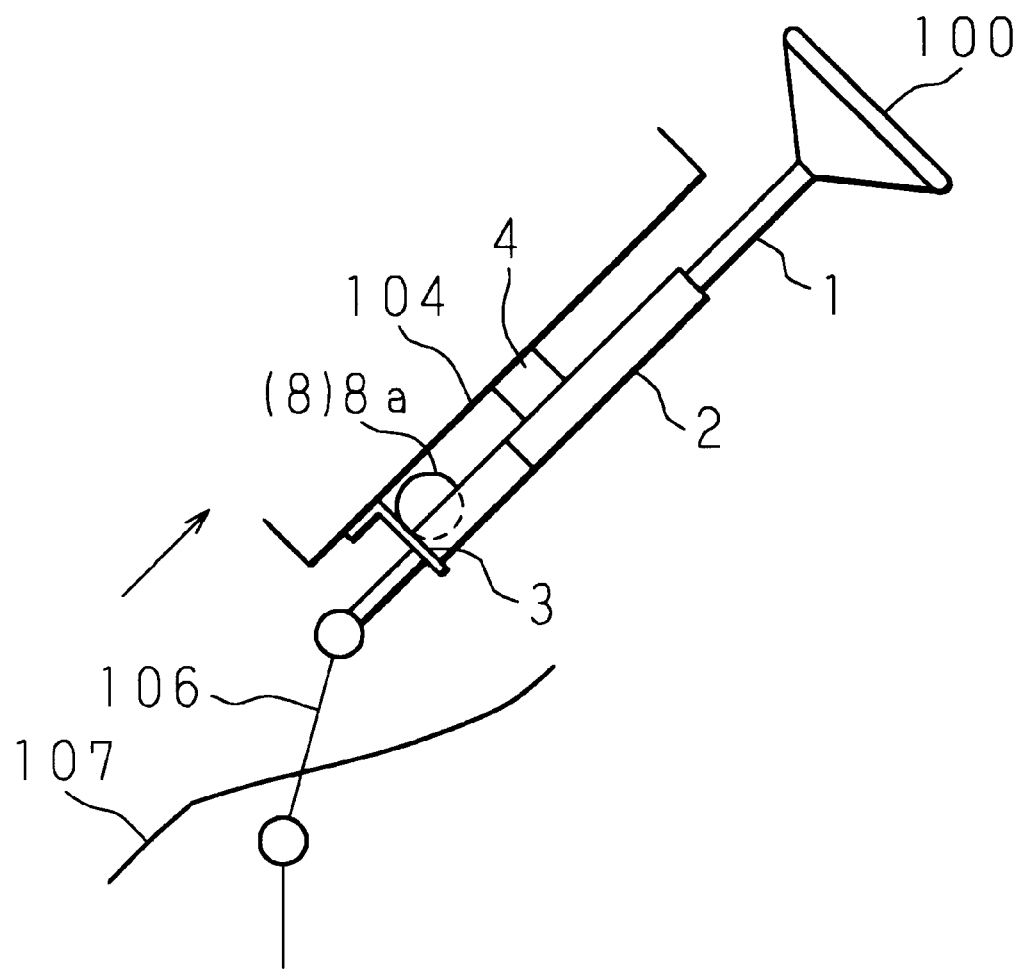
FIG. 2 is a depiction showing the function of an electric power steering apparatus according to the present invention.
Figure 3:
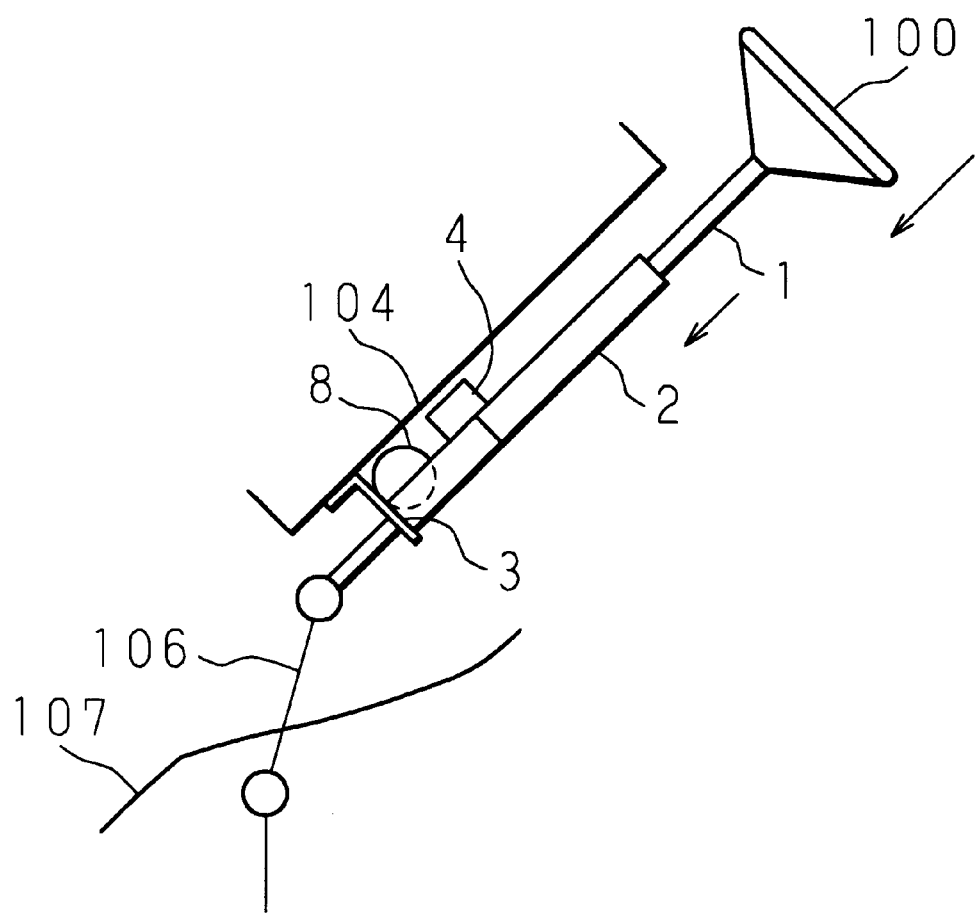
FIG. 3 is a depiction showing the function of a conventional electric power steering apparatus.

In the case where the mounting member 3 is detached and then the vehicle body 104 including the dash panel 107 rises due to the impact force of the primary collision, as shown in FIG. 2, a portion of the vehicle body 104 and the mounting member, etc. belonging to the vehicle body 104 may be caught on the electric motor 8a.

In this case, the through holes 50, 50 of the flange portion 8b of the electric motor 8a can not hold the bolts 53, 53 against the impact force of the secondary collision because of the presence of the notches 50a.

Moreover, at this time, the joint 55 and the positioning pins 54, 54 are broken by the impact force of the secondary collision because they are formed by a synthetic resin that is more easily broken than a metal.

Therefore, there is no means to keep the positional relationship between the electric motor 8a and the housing 2, and consequently the electric motor 8a is detached from the flange portion 22c of the motor-side cylindrical portion 22b in the upper side direction of the housing 2.

Figure 8:
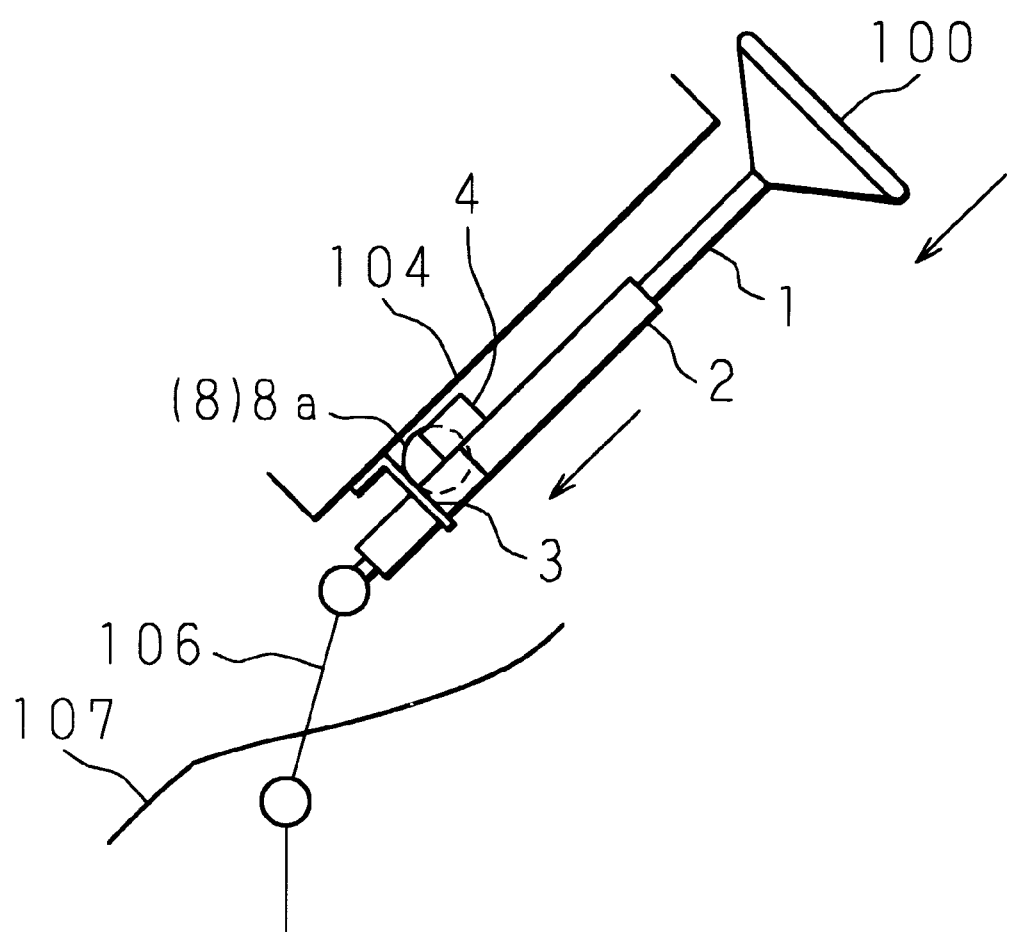
FIG. 8 is a depiction showing the function of an electric power steering apparatus according to the present invention.

Hence, as shown in FIG. 8, since the housing 2 can move to the lower side while leaving the electric motor 8a caught on a portion of the vehicle body 104 and the mounting member, etc. belonging to the vehicle body 104 at that position, the steering shaft 1 and housing 2 can shrink sufficiently in an axial direction, thereby satisfactorily absorbing the impact force of the secondary collision.

Besides, the same effect can be obtained by using the bolts 53, 53 made of a synthetic resin instead of forming the notches 50a in the through holes 50, 50 of the flange portion 8b of the electric motor 8a. In other words, if the bolts 53, 53 made of a synthetic resin are broken by the impact force of the secondary collision, the positional relationship between the electric motor 8a and housing 2 can not be retained, and consequently the electric motor 8a is detached from the flange portion 22c of the motor-side cylindrical portion 22b toward the upper side of the housing 2.

Embodiment 2

Figure 9:
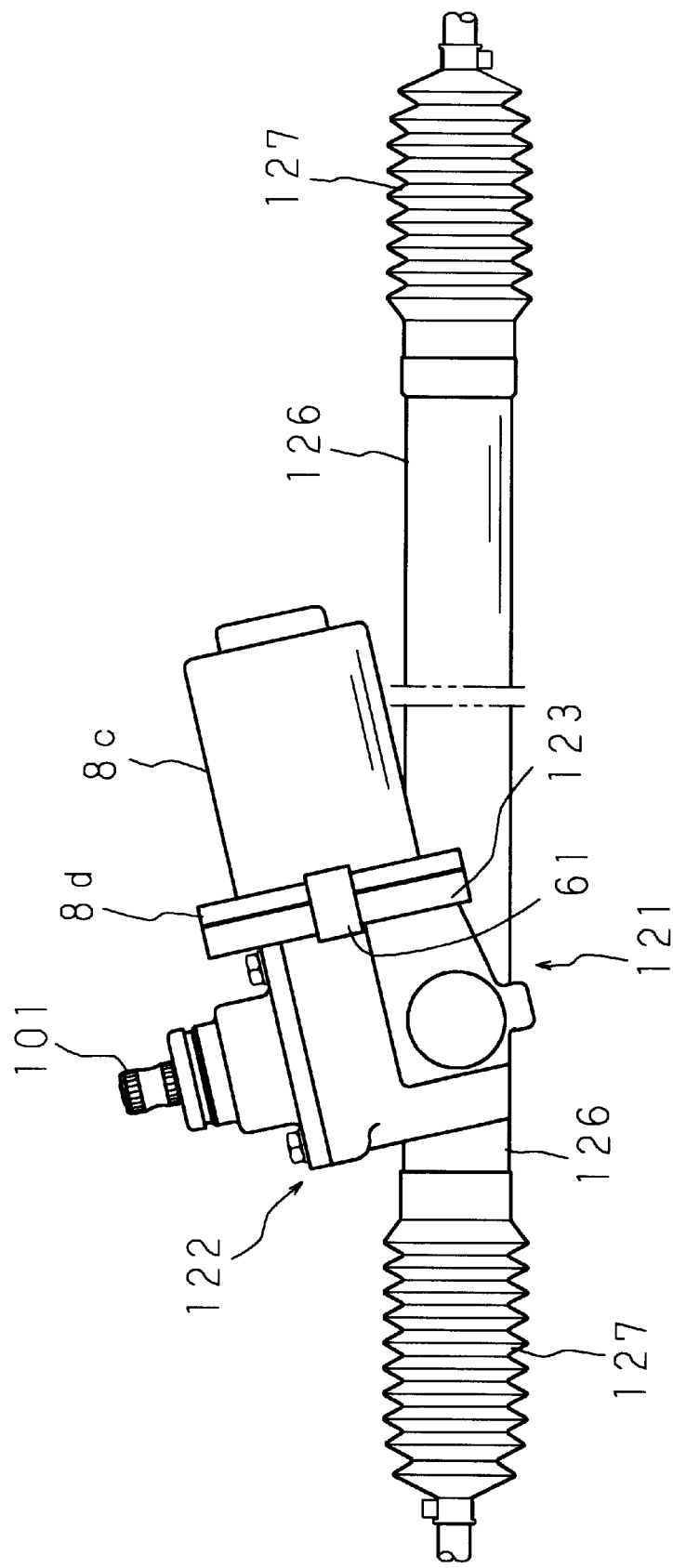
FIG. 9 is a front view showing the structure of an embodiment of an electric power steering apparatus according to the present invention.
Figure 10A:
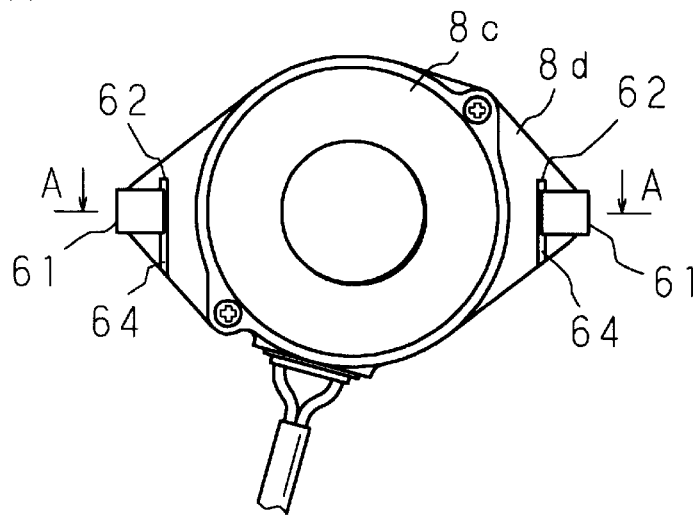
FIG. 10A is a plan view of an electric motor.
Figure 10B:
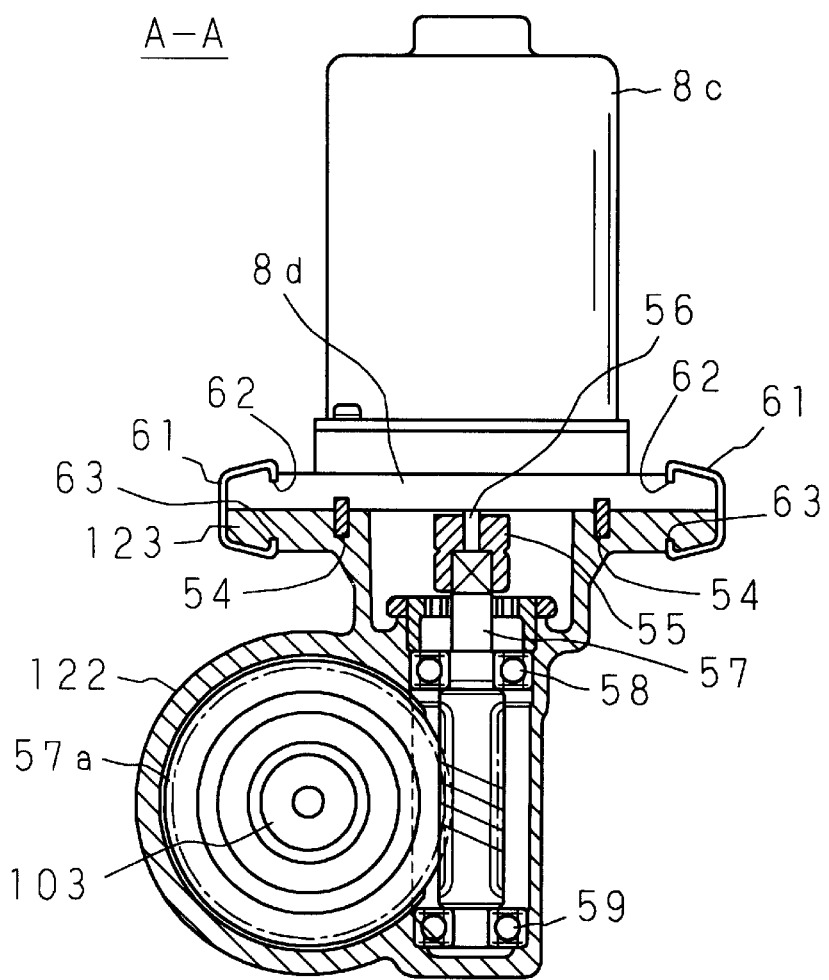
FIG. 10B is a partial transverse cross-sectional view of the electric motor and a housing.

FIG. 9 is a front view showing the structure of Embodiment 2 of an electric power steering apparatus according to the present invention. FIG. 10A is a plan view of the electric motor 8c, and FIG. 10B is a partial transverse cross-sectional view of the electric motor 8c and housing 122. This electric power steering apparatus is of a so-called pinion assist type, and comprises a second steering shaft 101 (input shaft) whose upper end portion is connected to a steering wheel (not shown) through a first steering shaft (not shown); a torsion bar (not shown) whose upper end portion is coaxially connected to the lower end portion of the second steering shaft 101; a third steering shaft 103 (output shaft) coaxially connected to the lower end portion of the torsion bar; and a torque sensor (not shown) for detecting a torque applied to the third steering shaft 103 and the second steering shaft 101 by rotation of the steering wheel, according to a twist of the torsion bar, all of which are housed in a housing 122.

The housing 122 also houses a reduction mechanism (gear mechanism) for transmitting to the third steering shaft 103 the rotation of a steering assisting electric motor 8c which is driven and controlled based on a torque detected by the torque sensor. This reduction mechanism is composed of a worm 57 for transmitting the rotation of the electric motor 8c, and a worm wheel which 57a meshes with the worm 57 and is fixed to the outer circumference of the third steering shaft 103 by fitting.

With this structure, the steering mechanism 121 operates with the rotation of the third steering shaft 103, and the operation of the steering mechanism 121 corresponding to the rotation of the steering wheel is assisted by the rotation of the electric motor 8c, thereby reducing the driver's labor for steering.

The electric motor 8c is coupled to the housing 122 by fastening a flange portion 8d of the electric motor 8c and a flange portion 123 provided in the housing 122 by two substantially C-shaped springs 61 (elastic members) as to be described later.

The steering mechanism 121 includes a pinion (not shown) attached to the lower end portion of the third steering shaft 103, a rack shaft (not shown) which is extended in the right and left directions at the front portion of the vehicle body and meshes with the pinion, a rack housing 126 for housing the rack shaft and a pair of bellows 127, 127 for sealing the space between both end portions of the rack shaft.

The housing 122 houses the above-mentioned torque sensor and reduction mechanism, and also supports the second steering shaft 101 and third steering shaft 103 rotatably.

The housing 122 houses the worm wheel 57a fixed to the outer circumference of the above-mentioned third steering shaft 103 by fitting, the worm 57 meshing with the worm wheel 57a, and ball bearings 58, 59 fitted on one side and the other side of the worm 57 in the axial direction, respectively.

Two engaging grooves 62, 62 and two engaging grooves 63, 63 are formed at mutually corresponding positions in the flange portion 8d of the electric motor 8c and the flange portion 123 of the housing 122, respectively. The electric motor 8c and housing 122 are coupled together by engaging tightly the respective end portions of the two substantially C-shaped springs 61 (elastic members) with the respective two engaging grooves 62, 63. Note that respective number of engaging grooves 62, engaging grooves 63 and C-shaped springs 61 may be equal to three or more.

Each of the engaging grooves 62 of the flange portion 8d of the electric motor 8c has an open end portion 64 which is open in the direction of the steering wheel. Therefore, even when parts attached to a vehicle body such as a transmission go down and are caught on the electric motor 8c due to a head-on collision of a vehicle, etc., the electric motor 8c is detached from the flange portion 123 of the housing 122 by the impact force.

The end potion 56 of the rotating shaft of the electric motor 8c is formed in a square plate shape, and an end portion of one side of the worm 57 in the axial direction is formed in a square column shape. These end portions are connected to each other by fitting them into holes formed in both bottom surfaces of a joint 55 formed by a synthetic resin, respectively.

Since the joint 55 is the same as that explained in Embodiment 1 and illustrated in FIG. 7, the explanation thereof is omitted.

The flange portion 8d of the electric motor 8c and the flange portion 123 of the housing 122 respectively have holes formed at two opposite positions in their mutually facing surfaces. Their mutual positions are determined by fitting the pins 54, 54 (positioning members) formed by a synthetic resin into the holes, respectively.

Figure 11:
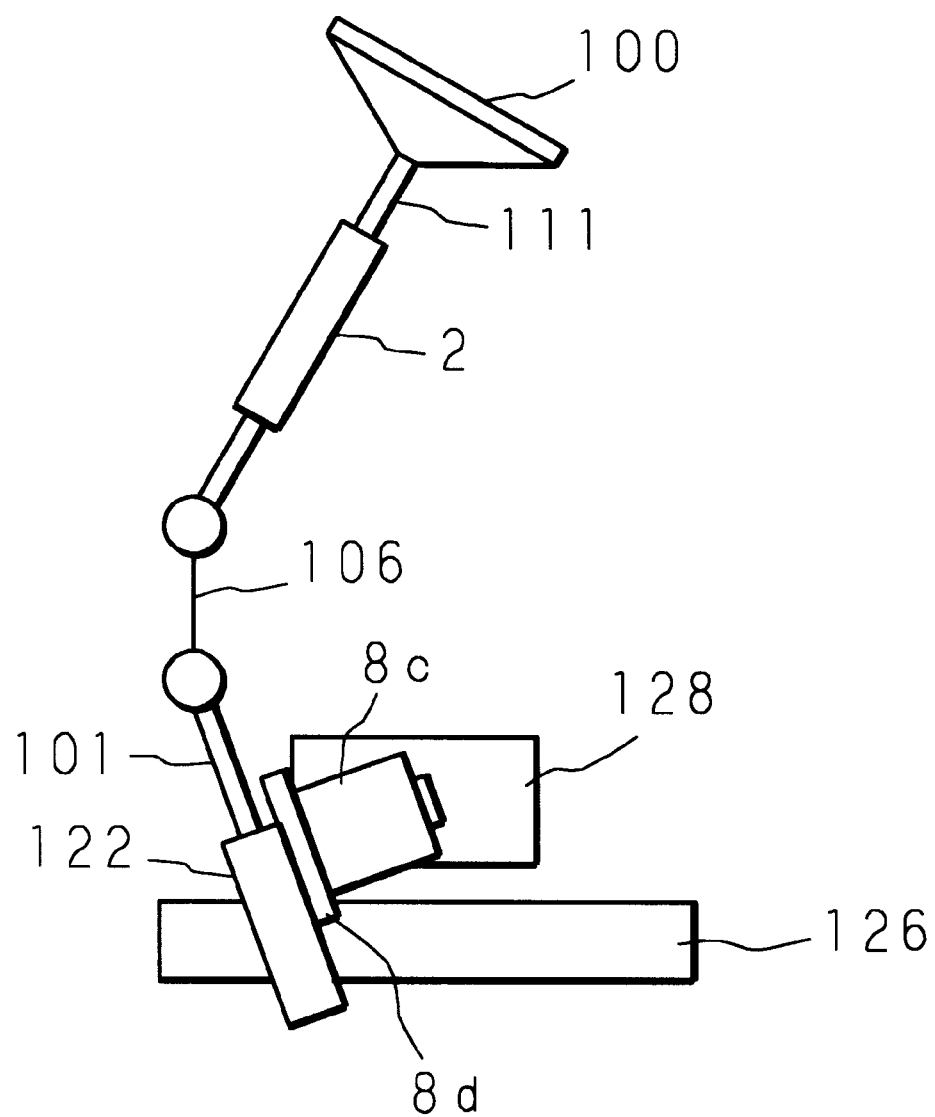
FIG. 11 is a depiction showing a state in which an electric power steering apparatus according to the present invention is mounted on a vehicle body.

FIG. 11 is a depiction showing a state in which the electric power steering apparatus having such a structure is mounted on a vehicle body. According to this depiction, in the electric power steering apparatus, a first steering shaft 111 is connected to a steering wheel 100, and a housing 2 houses the first steering shaft 111 rotatably. The lower-side end portion of the first steering shaft 111 and the upper end portion of a second steering shaft 101 are connected by a joint 106; the housing 122 houses the above-mentioned torsion bar, third steering shaft 103, torque sensor and the reduction mechanism of the electric motor 8c; and the electric motor 8c is coupled to the housing 122 so that the direction of its rotating shaft and the direction of the third steering shaft 103 housed in the housing 122 cross at right angles.

The above-mentioned rack housing 126 housing the rack shaft is extended in the right and left directions at the front portion of the vehicle body so as to cross the housing 122.

In such an electric power steering apparatus, when a head-on collision of a vehicle occurs, parts 128 attached to the vehicle body such as a transmission may go down and be caught on the electric motor 8c due to the impact force of the primary collision.

In this case, the end portions of the springs 61 coupling the electric motor 8c and housing 122 together are disengaged from the open end portions 64 of the engaging grooves 62, while the joint 55 and the positioning pins 54, 54 are broken by the impact force of the secondary collision because they are formed by a synthetic resin that is broken more easily than a metal. Therefore, the electric motor 8c is detached from the flange portion 123 of the housing 122 in the lower side direction of the housing 122.

Figure 12:
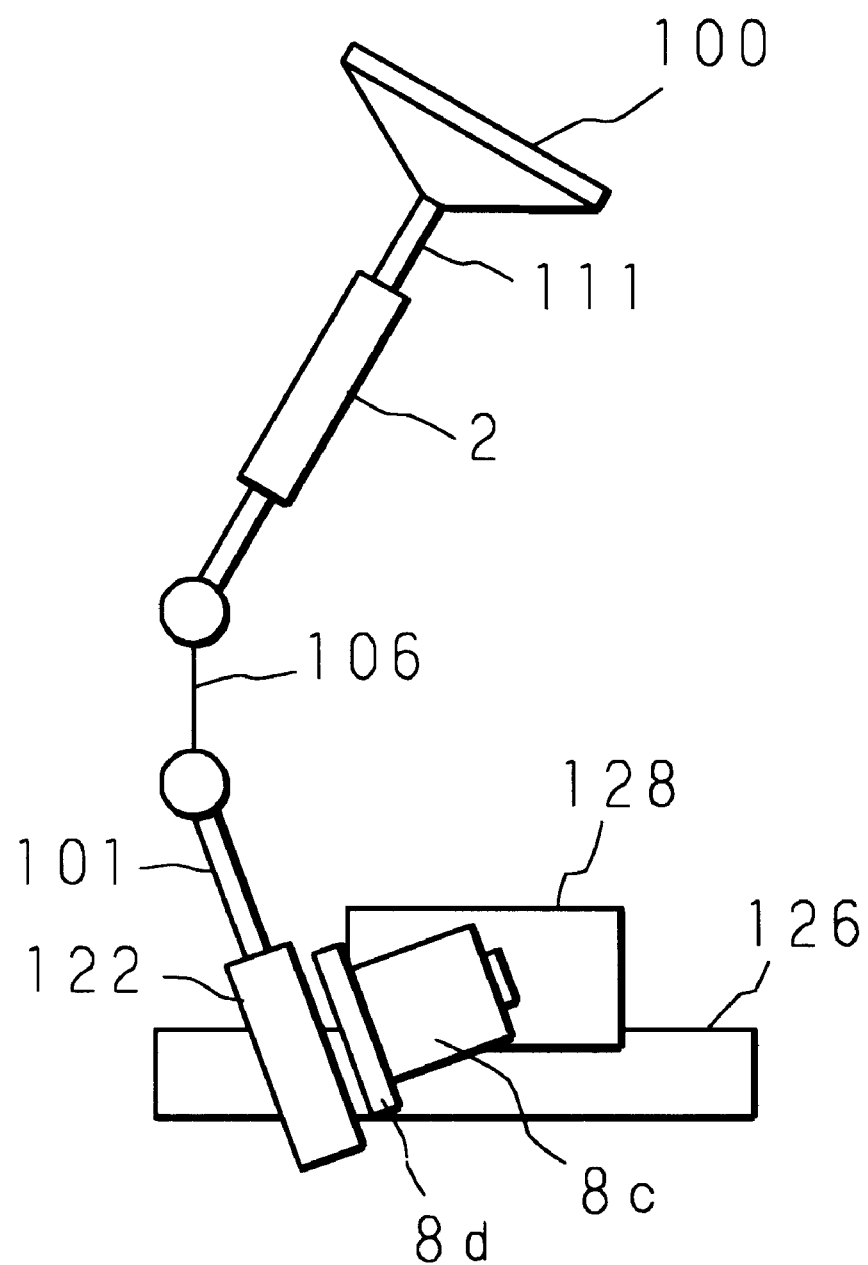
FIG. 12 is a depiction showing the function of an electric power steering apparatus according to the present invention.

Thus, as shown in FIG. 12, since the parts 128 such as a transmission can go down sufficiently together with the electric motor 8c, the vehicle body can deform sufficiently and absorb the impact force sufficiently.

Additionally, the open end portions 64 may be formed in either the two engaging grooves 62 in the flange portion 8d of the electric motor 8c or the two engaging grooves 63 in the flange portion 123 of the housing 122. However, in the case where the open end portions 64 are formed in the two engaging grooves 62 in the flange portion 8d, as described above, the open end portions 64 should be open in the direction of the steering wheel. On the other hand, when the open end portions 64 are formed in the two engaging grooves 63 in the flange portion 123, the open end portions 64 should be open in the opposite direction to the steering wheel.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:
   a housing for rotatably housing a steering shaft interlocked with a steering wheel;
   an electric motor having a through hole through which a screw member is inserted to attach said electric motor to said housing; and a gear mechanism, connected to said electric motor through a joint, for transmitting a torque of said electric motor to said steering shaft, wherein in order to detach said electric motor from said housing by an impact force in axial direction of said steering shaft, said through hole has a notch, and said joint is formed by a synthetic resin.

2. The electric power steering apparatus as set forth in claim 1, wherein in order to detach said electric motor from said housing by an impact force in an axial direction of said steering shaft, said notch is open from said through hole in an opposite direction to said steering wheel.

3. The electric power steering apparatus according to claim 1, wherein said joint is cylindrical in shape and includes first and second holes for receiving a rotating shaft of the electric motor and an end portion of a worm of said gear mechanism, respectively, and a notch formed in an outer circumferential surface thereof.

4. An electric power steering apparatus, comprising:

a housing for rotatably housing a steering shaft interlocked with a steering wheel;

an electric motor having a through hole through which a screw member is inserted to attach said electric motor to said housing, said electric motor being positioned by a positioning member; and a gear mechanism, connected to said electric motor through a joint, for transmitting a torque of said electric motor to said steering shaft, wherein in order to detach said electric motor from said housing by an impact force in an axial direction of said steering shaft, said through hole has a notch, and said positioning member and joint are formed by a synthetic resin.

5. The electric power steering apparatus as set forth in claim 4, wherein in order to detach said electric motor from said housing by an impact force in an axial direction of said steering shaft, said notch is open from said through hole in an opposite direction to said steering wheel.

6. The electric power steering apparatus according to claim 4, wherein said joint is cylindrical in shape and includes first and second holes for receiving a rotating shaft of the electric motor and an end portion of a worm of said gear mechanism, respectively, and a notch formed in an outer circumferential surface thereof.

7. The electric power steering apparatus according to claim 4, wherein said positioning member is at least one pin fitted into respective holes formed in said electric motor and said housing.

8. An electric power steering apparatus, comprising:

a housing having at least two engaging grooves, for rotatably housing a steering shaft interlocked with a steering wheel;

an electric motor having at least two engaging grooves provided at positions corresponding to said at least two grooves of said housing, said electric motor being positioned by a positioning member and attached to said housing by tightly engaging respective end portions of at least two curved elastic members with the respective said at least two engaging grooves of said housing and said at least two engaging grooves of said electric motor; and a gear mechanism, connected to said electric motor through a joint, for transmitting a torque of said electric motor to said steering shaft, wherein in order to detach said electric motor from said housing by an impact force in an axial direction of said steering shaft, a part or all of said engaging grooves of said electric motor are open in a predetermined direction, and said positioning member and joint are formed by a synthetic resin.

9. The electric power steering apparatus according to claim 8, wherein said joint is cylindrical in shape and includes first and second holes for receiving a rotating shaft of the electric motor and an end portion of a worm of said gear mechanism, respectively, and a notch formed in an outer circumferential surface thereof.

10. The electric power steering apparatus according to claim 8, wherein said positioning member is at least one pin fitted into respective holes formed in said electric motor and said housing.

11. An electric power steering apparatus comprising:

an electric motor attached by a screw member inserted through a hole to a housing for rotatably housing a steering shaft interlocked with a steering wheel; and a gear mechanism, connected to said electric motor through a joint, for transmitting a torque of said electric motor to said steering shaft, wherein in order to detach said electric motor from said housing by an impact force in an axial direction of said steering shaft, said screw member and joint are formed by a synthetic resin.

12. The electric power steering apparatus according to claim 11, wherein said joint is cylindrical in shape and includes first and second holes for receiving a rotating shaft of the electric motor and an end portion of a worm of said gear mechanism, respectively, and a notch formed in an outer circumferential surface thereof.

13. The electric power steering apparatus according to claim 11, further comprising a positioning member for positioning said electric motor, said positioning member being formed by a synthetic resin.

14. The electric power steering apparatus according to claim 13, wherein said positioning member is at least one pin fitted into respective holes formed in said electric motor and said housing.

15. The electric power steering apparatus according to claim 11, further comprising a notch formed in said through hole.

16. The electric power steering apparatus according to claim 15, wherein in order to detach said electric motor from said housing by an impact force in an axial direction of said steering shaft, said notch is open from said through hole in an opposite direction to said steering wheel.

* * * * *